(12) United States Patent
Rajagopalan et al.

(10) Patent No.: US 9,289,655 B2
(45) Date of Patent: Mar. 22, 2016

(54) USE OF CURABLE COMPOSITIONS CONTAINING DITHIANE MONOMERS FOR GOLF BALL CORES

(71) Applicant: Acushnet Company, Fairhaven, MA (US)

(72) Inventors: Murali Rajagopalan, Fairhaven, MA (US); Michael J. Sullivan, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 169 days.

(21) Appl. No.: 14/102,685

(22) Filed: Dec. 11, 2013

(65) Prior Publication Data

US 2015/0157898 A1   Jun. 11, 2015

(51) Int. Cl.
*A63B 37/04* (2006.01)
*C08K 5/45* (2006.01)
*A63B 37/00* (2006.01)
*A63B 45/00* (2006.01)

(52) U.S. Cl.
CPC ......... *A63B 37/0077* (2013.01); *A63B 37/0024* (2013.01); *A63B 37/0027* (2013.01); *A63B 37/0051* (2013.01); *A63B 37/0063* (2013.01); *A63B 37/0076* (2013.01); *A63B 37/0093* (2013.01); *A63B 45/00* (2013.01); *C08K 5/45* (2013.01)

(58) Field of Classification Search
None
See application file for complete search history.

(56) References Cited

U.S. PATENT DOCUMENTS

| 5,252,652 | A | 10/1993 | Egashira et al. |
| 5,553,852 | A | 9/1996 | Higuchi et al. |
| 5,585,440 | A | 12/1996 | Yamada et al. |
| 5,743,817 | A | 4/1998 | Yamagishi et al. |
| 5,782,707 | A | 7/1998 | Yamagishi et al. |
| 6,162,135 | A | 12/2000 | Bulpett et al. |
| 6,634,961 | B2 | 10/2003 | Higuchi et al. |
| 6,679,791 | B2 | 1/2004 | Watanabe |
| 7,495,054 | B2 | 2/2009 | Lewandowski et al. |
| 2007/0066748 | A1 | 3/2007 | Lewandowski et al. |

*Primary Examiner* — David Buttner
(74) *Attorney, Agent, or Firm* — Adler Pollock & Sheehan P.C.; Daniel J. Holmander, Esq.; George N. Chaclas, Esq.

(57) ABSTRACT

The present invention is directed to a golf ball and, more particularly, a golf ball core having a curable core composition comprising a dithiane compound, a rubber based compound comprising cis-1,4-polybutadiene rubber, a crosslinking agent comprising a metallic salt of unsaturated carboxylic acid in an amount between 10 to 50 parts per hundred of rubber (pphr), a peroxide initiator, one or more filler materials, and optionally an organ sulfur compound, are used to provide soft and resilient cores.

16 Claims, 1 Drawing Sheet

USE OF CURABLE COMPOSITIONS CONTAINING DITHIANE MONOMERS FOR GOLF BALL CORES

FIELD OF THE INVENTION

The present invention is directed to a golf ball and, more particularly, a golf ball core having a curable core composition comprising a dithiane compound, a rubber based compound comprising cis-1,4-polybutadiene rubber, a crosslinking agent comprising a metallic salt of unsaturated carboxylic acid in an amount between 10 to 50 parts per hundred of rubber (pphr), a peroxide initiator, one or more filler materials, and optionally, an organo sulfur compound, are used to provide soft and resilient cores.

BACKGROUND OF THE INVENTION

Conventional golf balls can be divided into several general classes: (a) solid golf balls having one or more layers, and (b) wound golf balls. Solid golf balls include one-piece balls, which are easy to construct and relatively inexpensive, but have poor playing characteristics and are thus generally limited for use as range balls. Two-piece balls are constructed with a generally solid core and a cover and are generally the most popular with recreational golfers because they are very durable and provide maximum distance.

Balls having a two-piece construction are commonly formed of a polymeric core encased by a cover. Typically, the core is formed from polybutadiene that is chemically crosslinked with zinc diacrylate and/or other similar crosslinking agents. These balls are generally easy to manufacture, but are regarded as having limited playing characteristics. Solid golf balls also include multi-layer golf balls that are comprised of a solid core of one or more layers and/or a cover of one or more layers. These balls are regarded as having an extended range of playing characteristics.

Wound golf balls are generally preferred by many players due to their high spin and soft "feel" characteristics. Wound golf balls typically include a solid, hollow, or fluid-filled center, surrounded by a tensioned elastomeric material and a cover. Wound balls generally are more difficult and expensive to manufacture than solid two-piece balls.

A variety of golf balls designed to provide a wide range of playing characteristics, i.e., the compression, velocity, "feel," and spin, that can be optimized for various playing ability, are known in the prior art.

A conventional core composition used in the commercial golf balls utilizes non-dithiane compounds and still there is a need to improve its resiliency without sacrificing its soft feel to provide a balance of golf ball performance both at the driver as well as in a short game.

BRIEF SUMMARY OF THE INVENTION

The golf ball of the present invention comprises a core and a cover. A curable core composition comprises a dithiane compound, a rubber based compound comprising cis-1,4-polybutadiene rubber, a crosslinking agent comprising a metallic salt of unsaturated carboxylic acid in an amount between 10 to 50 parts per hundred of rubber (pphr), a peroxide initiator, one or more filler materials, and optionally, an organo sulfur compound are used to provide soft and resilient cores.

The base rubber may comprise natural or synthetic rubbers. A preferred base rubber is 1,4-polybutadiene having a cis-structure of at least 40%, more preferably at least about 90%, and most preferably at least about 95%.

The crosslinking agents may also be diacrylates, and preferably metallic diacrylates such as zinc diacrylate (ZDA), zinc dimethacrylate (ZDMA), and mixtures thereof. In one embodiment, the core has a range of hardness gradient less than 0 to 8 in JIS C Scale, preferably a range from −4 to 8 in JIS C Scale, and more preferably less than 0 to 4 in JIS C Scale.

The initiator can be any known polymerization initiator which decomposes during the cure cycle. Suitable initiators include organic peroxide compounds, such as dicumyl peroxide; 1,1-di(t-butylperoxy) 3,3,5-trimethyl cyclohexane; α,α-bis(t-butylperoxy)diisopropylbenzene; 2,5-dimethyl-2, 5di(t-butylperoxy) hexane; di-t-butyl peroxide; and mixtures thereof.

Fillers typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like.

The dithiane compound comprises at least one or more dithiane monomers. In one embodiment, the curable core composition comprises between about 0.25 pphr and about 5 pphr of the dithiane compound. In a further embodiment, the dithiane compound comprises at least one monomer that comprises a cyclic dithiane moiety linked to a (meth)acryloyl moiety.

In another embodiment, the golf ball further comprises an intermediate layer formed from a thermoplastic or thermoset material. The golf ball may also include an inner and outer cover layer formed from a thermoplastic or thermoset material. At least one of the cover layers comprises a material selected from a group consisting of: ionomeric material, vinyl resins, polyolefins, polyurethanes, polyureas, polyamides, acrylic resins, polyphenylene oxide resins, thermoplastic polyesters, thermoplastic vulcanized rubbers, fully-neutralized polymers, polycarbonates, polybutylene terephthalates, acrylonitriles, partially-neutralized polymers, and mixtures thereof.

Also, the cover may have a thermoset composition comprising at least one of a UV absorber, a hindered amine light stabilizer, or an optical brightener. In another embodiment, the intermediate and inner cover layer comprise a moisture resistant composition having a moisture vapor transition rate (MVTR) of 12.5 gmil/100 in2/day or less.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENTS

Figure 1:
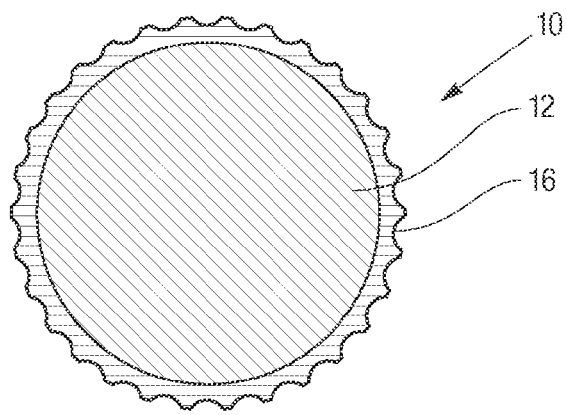
FIG. 1 is a cross-sectional view of a two-piece golf ball having a cover and a core.

The golf ball of the present invention comprises a core and a cover. A curable core composition comprises a dithiane compound, a rubber based compound comprising cis-1,4-polybutadiene rubber, a crosslinking agent comprising a metallic salt of unsaturated carboxylic acid in an amount between 10 to 50 parts per hundred of rubber (pphr), a peroxide initiator, one or more filler materials, and optionally, organ sulfur compound are used to provide soft and resilient cores.

The dithiane compound comprises at least one or more dithiane monomers. In one embodiment, the curable core composition comprises between about 0.25 pphr and about 5 pphr of the dithiane compound. In a further embodiment, the dithiane compound comprises at least one monomer that comprises a cyclic dithiane moiety linked to a (meth)acryloyl moiety.

The dithiane compound of the present invention includes, but is not limited to, those having the following general formula (1):

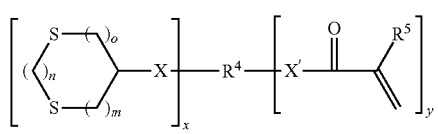

(1)

wherein X and X' are each independently an —O— or —NR$^1$—, wherein R$^1$ is an H or a C$_1$-C$_4$ alkyl group; each R$^5$ is independently an H, a C$_1$-C$_4$ alkyl group, R$^4$ is an organic radical having a valence of x+y, such as a polyvalent organic group which can be cyclic, branched, linear, aliphatic, aromatic, or heterocyclic, optionally having catenary (i.e., in chain) nitrogen, and nonperoxidic oxygen atoms, and optionally having one or more organic functional groups including ester, ketone, carbonyl, amide, urea, carbonate and urethane functional groups, preferably R$^4$ is a polyvalent aliphatic or aromatic group, optionally having catenary (i.e. in chain) oxygen atoms, and optionally having one or more organic functional groups including ester, ketone, carbonyl, amide, urea, carbonate and urethane functional groups; n is 3 to 6, preferably 3 to 5; m is 1 to 3, o is 1 to 3, x and y are at least 1, one or more methylene groups on the dithiane ring may be substituted with C$_1$-C$_4$ alkyl group, and adjacent alkyl groups may be joined with the carbon atoms to which they are attached to form a carbocyclic ring. Preferably, the dithiane ring has 8 or 9 ring atoms.

With respect to Formula (1), it will be understood that the R$^4$ group may contain one or more catenary (in chain) organic functional groups including ester, ketone, carbonyl, amide, imide, urea, carbonate anhydride, and urethane functional groups, and further that the combinations of —X—R$^4$—, or —R$^4$—X' may in combination form a terminal functional group including imide, urea, carbonate, anhydride, and urethane functional groups. For example, where X' is —O—, and R$^4$ terminates in a carbonyl group, an ester results. Where X' is nitrogen, and R$^4$ terminates in an amide (—NHC(O)—, a urea results.

The curable core compositions of the invention may optionally include additional monomers, typically a substituted or unsubstituted (meth)acryloyl compound, such as, for example, a di(meth)acrylate, an aliphatic (meth)acrylate having at least one functional group, and/or a (meth)acrylate with an aromatic functionality. Examples of suitable substituted (meth)acryloyl compounds include, but are not limited to, phenethyl methacrylate, ethoxylated bisphenol A dimethacrylate (BisEMA6), 2-hydroxyethyl methacrylate (HEMA), bisphenol A diglycidyl dimethacrylate (bisGMA), 1,1,1-tri-[4-(methacryloxyethoxy)-phenyl]ethane (TMPE) and 1,1,1-tri-[4-(2-methyl-2-methacryloxyethoxy)-phenyl]ethane (TMMPE), urethane dimethacrylate (UDMA), triethlyene glycol dimethacrylate (TEGDMA), glycerol dimethacrylate (GDMA), ethyleneglycol dimethacrylate, neopentylglycol dimethacrylate (NPGDMA), and polyethyleneglycol dimethacrylate (PEGDMA).

The dithiane monomeric compounds may be prepared by reference to the following exemplary scheme.

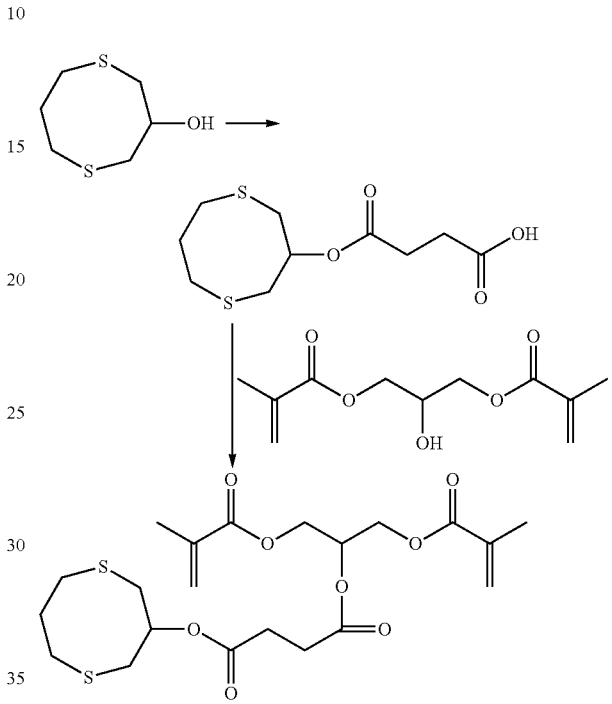

Here, a hydroxy functional cyclic dithiane compound is reacted with a diacid (or equivalent), then further reacted with a hydroxy functional dimethacrylate. It will be understood that the other synthetic pathways will be evident to one skilled in the art. For example, the hydroxyl of the dithiane ring compound may be replaced by another functional group, such as an amine, that is reactive toward the acid functional group of the acid. Likewise the acid group of the diacid (or equivalent) may be replaced by another functional group that is co-reactive with the hydroxyl of the cyclic dithiane compound. The diacid may be replaced by another polyfunctional compound, having two or more reactive functional groups, that are co-reactive with the functional groups of the depicted cyclic dithiane compound and the depicted hydroxy functional dimethacrylate.

Exemplary combinations include hydroxyl or amino functional groups reacting with azlactone-, isocyanate-, and anhydride-functional groups and carboxyl groups reacting with isocyanate- and oxazoline-functional groups.

Representative examples of the compounds of the invention are as follows:

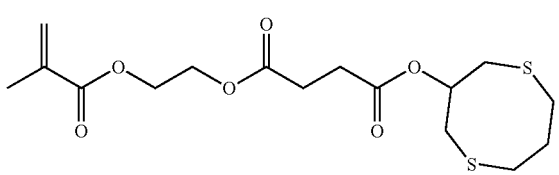

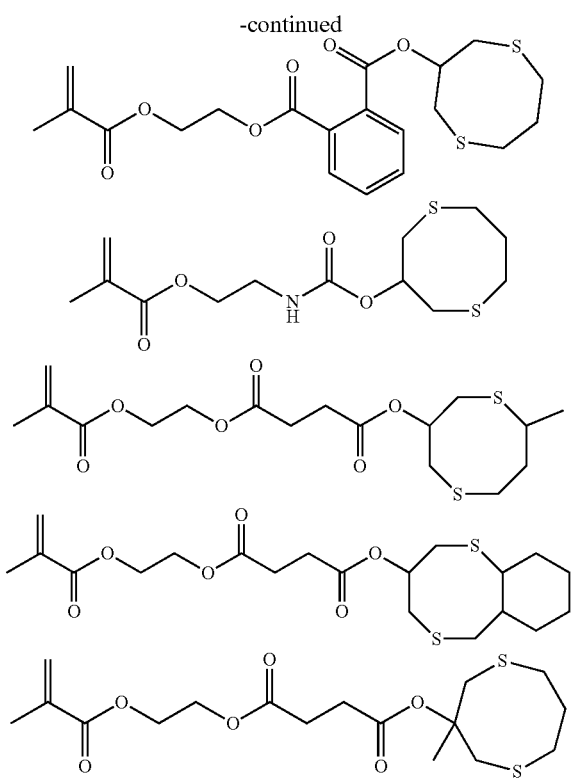

The curable core compositions of the present invention may also include one or more ethylenically unsaturated components such as mono(meth)acryloyl compounds, in addition to the dithiane acryloyl compound. Examples of useful mono (meth)acryloyl compounds include acrylic acid esters, methacrylic acid esters, hydroxy-functional acrylic acid esters, hydroxy-functional methacrylic acid esters, acrylamides, methacrylamides, and combinations thereof. The golf balls of the present invention can include those materials and constructions as described in U.S. Published Patent Application No. 2007/0066748 published Feb. 24, 2009, which is incorporated herein by reference in its entirety.

Golf balls of the present invention comprising a dithiane compound may have a variety of further configurations. The golf balls can include one-piece, two-piece, multi-layer, and wound golf balls having a variety of core structures, intermediate layers, covers, and coatings.

Golf ball cores of the present invention may comprise a single, unitary layer, comprising the entire core from the center of the core to its outer periphery. Also, the core maybe a single, double, triple or more layer cores. Alternatively, the cores may comprise or consist of a center surrounded by at least one outer core layer. The center, innermost portion of such multi-layer cores is most often solid, but may be hollow or liquid-, gel-, gas-filled, or other types of cores. The outer core layer may be solid, or it may be a wound layer formed of a tensioned elastomeric or non-elastomeric material.

Figure 2:
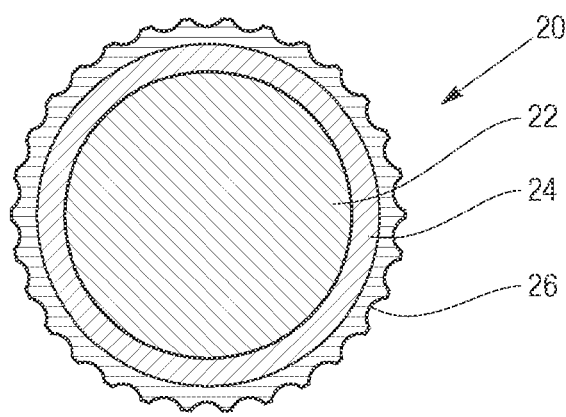
FIG. 2 is a cross-section of a golf ball having an intermediate layer between a cover and a core.

Referring to FIG. 1, a golf ball 10 of the present invention comprising a dithiane compound can include a core 12 and a cover 16 surrounding the core 12. Referring to FIG. 2, a golf ball 20 of the present invention can include a core 22, a cover 26, and at least one intermediate layer 24 disposed between the cover and the core. Each of the cover and core may include more than one layer; i.e., the golf ball can be a conventional three-piece wound ball, a two-piece ball, a ball having a multi-layer core and an intermediate layer or layers, etc.

Figure 3:
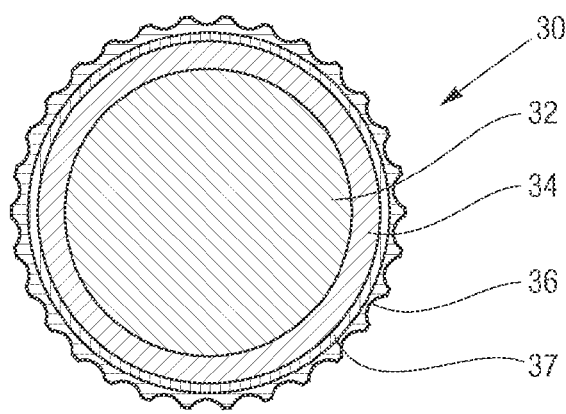
FIG. 3 is a cross-section of a golf ball having an intermediate layer between a cover and a core, and the cover having an inner cover layer according to the invention.

Thus, referring to FIG. 3, a golf ball 30 of the present invention can include a core 32, an inner 37 and outer cover layer 36, and at least one intermediate layer 34 disposed between the cover and the core. It will be appreciated that any number or type of intermediate layers may be used, as desired. It should also be noted that the dithiane compound may be used within any portion or layer of the golf ball.

The base rubber may comprise natural or synthetic rubbers. A preferred base rubber is 1,4-polybutadiene having a cis-structure of at least 40%, more preferably at least about 90%, and most preferably at least about 95%. Most preferably, the base rubber comprises high-Mooney-viscosity rubber. For example, in one embodiment, the polybutadiene rubber has high cis content of 95% and greater. Preferably, the base rubber has a Mooney viscosity greater than about 35, more preferably greater than about 50. Preferably, the polybutadiene rubber has a molecular weight greater than about 400,000 and a polydispersity of no greater than about 2. Examples of desirable polybutadiene rubbers include BUNA® CB1221 commercially available from Lanxess Corporation; UBEPOL® 360L and UBEPOL® 150L, commercially available from UBE Industries of Tokyo, Japan. If desired, the polybutadiene can also be mixed with other elastomers known in the art such as natural rubber, polyisoprene rubber and/or styrene-butadiene rubber in order to modify the properties of the core.

The crosslinking agent may comprise a metallic salt of unsaturated carboxylic acid in an amount between 10 to 50 parts per hundred of rubber (pphr). In one embodiment, the crosslinking agent may be in an amount of 10 parts per hundred of rubber (pphr). The crosslinking agent may be present in an amount greater than about 10 parts per hundred of rubber (pphr), preferably from about 10 to 50 parts per hundred of rubber (pphr), more preferably from about 25 to 35 parts per hundred of rubber (pphr).

Crosslinking agents are typically included to increase the hardness of the reaction product. The crosslinking agent must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to those of ordinary skill in the art.

Examples include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, zinc dimethacrylate, and mixtures thereof.

In one embodiment, the initiator may be a peroxide initiator in an amount between 0.25 to 2.5 pphr, and preferably between 0.25 to 1.5 pphr. The initiator can also be any known polymerization initiator which decomposes during the cure cycle. Suitable initiators include organic peroxide compounds, such as dicumyl peroxide; 1,1-di(t-butylperoxy) 3,3,5-trimethyl cyclohexane; α,α-bis(t-butylperoxy)diisopropylbenzene; 2,5-dimethyl-2,5di(t-butylperoxy) hexane; di-t-butyl peroxide; and mixtures thereof. Other examples include, but are not limited to, VAROX® 231XL and Varox® DCP-R, commercially available from Elf Atochem of Philadelphia, Pa.; PERKODOX® BC and PERKODOX® 14, commercially available from Akzo Nobel of Chicago, Ill.; and ELASTOCHEM® DCP-70, commercially available from Rhein Chemie of Trenton, N.J.

It is well known that peroxide initiators are available in a variety of forms having different activity. The activity is typically defined by the "active oxygen content." For example, PERKODOX® BC peroxide is 98% active and has an active oxygen content of 5.80%, whereas PERKODOX® DCP-70 is 70% active and has an active oxygen content of 4.18%. If the peroxide is present in pure form, it is preferably present in an amount of at least about 0.25 pphr, more preferably between about 0.35 pphr and about 2.5 pphr, and most preferably between about 0.5 pphr and about 2 pphr. Peroxides are also available in concentrate form, which are well-known to have differing activities, as described above. In this case, if concentrate peroxides are employed in the present invention, one skilled in the art would know that the concentrations suitable for pure peroxides are easily adjusted for concentrate peroxides by dividing by the activity. For example, 2 pphr of a pure peroxide is equivalent 4 pphr of a concentrate peroxide that is 50% active (i.e., 2 divided by 0.5=4).

Filler materials typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like. Filler materials added to one or more portions of the golf ball typically include processing aids or compounds to affect rheological and mixing properties, density-modifying fillers, tear strength, or reinforcement fillers, and the like. The filler materials are generally inorganic, and suitable filler materials include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Filler materials may also include various foaming agents or blowing agents which may be readily selected by one of ordinary skill in the art. Filler materials may include polymeric, ceramic, metal, and glass microspheres may be solid or hollow, and filled or unfilled. Filler materials are typically also added to one or more portions of the golf ball to modify the density thereof to conform to uniform golf ball standards. Filler materials may also be used to modify the weight of the center or at least one additional layer for specialty balls, e.g., a lower weight ball is preferred for a player having a low swing speed.

In one embodiment, the core composition of the golf ball may comprise an organo sulfur compound selected from a group consisting of: ZnPCTP, DTDS, DPDS, and mixtures thereof. In some formulations, optionally additional organa sulfur compounds like ZnPCTP or DTDS or DPDS or related materials may be incorporated from 0.25 to 2.5 pphr to provide additional soft and resilient property.

In one embodiment, the core composition of the golf ball may comprise one or more antioxidants. Typically, antioxidants are included in conventional rubber-based golf ball component compositions because antioxidants are included in the materials supplied by manufacturers of compounds used therein. Without being bound to any particular theory, higher amounts of antioxidant in the reaction product may result in less trans-isomer content because the antioxidants consume at least a portion of the free radical source. For example, a polybutadiene reaction product with 0.5 pphr of antioxidant cured at 335 degrees F. for 11 minutes results in about 15 percent trans-isomer content at an exterior surface of the center and about 13.4 percent at an interior location after the conversion reaction. In contrast, the same polybutadiene reaction product substantially free of antioxidants results in about 32 percent trans-isomer content at an exterior surface and about 21.4 percent at an interior location after the conversion reaction.

In one embodiment, the core has a range of hardness gradient less than 0 to 8, preferably a range from −4 to 8 in JIS C Scale, and more preferably or 0 to 4 in JIS C Scale. The core has a core surface hardness about 20 to 60 Shore D, preferably 25 to 56 Shore D, and most preferably 30 to 50 Shore D. The core has a flexural modulus from 2 to 35 kpsi, preferably 5 to 25 kpsi, and most preferably 10 to 20 kpsi.

In another embodiment, the curable core composition comprises 10 to 60 wt. % total dithiane compound and metallic diacrylates and 90 to 40 wt. % additional materials.

In another embodiment, the golf ball further the golf ball further comprises one or more layers. Optionally, additional intermediate layers may be disposed between the core and cover. In one embodiment of the present invention, golf ball includes a core and a cover layer. In another embodiment, the golf ball includes a core, an intermediate layer, and a cover layer. An intermediate layer may be formed from a thermoplastic or thermoset material. In one embodiment, the intermediate layer has a thickness of 0.010 to 0.030 inches, preferably 0.015 to 0.025 inches, and more preferably 0.015 to 0.020 inches.

The golf ball may also include an inner and outer cover layer formed from a thermoplastic or thermoset material. In general, the cover layer, or any layer of a multiple layer cover, can be formed of suitable polymers such as the copolymers described herein, polyurethanes, or polyureas. The outer cover layer and/or the inner cover layer can comprise a light stable polyurethane, polyurea, and/or the copolymers described herein. In one embodiment, the outer cover is formed from a thermoplastic composition including ionomers, acid copolymers, thermoplastic urethanes as well as from the thermoset polyurethane or polyuria or expoy and cross-linkable rubber compositions including BR and non-BR formulations.

At least one of the cover layers comprises a material selected from a group consisting of: ionomeric material, vinyl resins, polyolefins, polyurethanes, polyureas, polyamides, acrylic resins, polyphenylene oxide resins, thermoplastic polyesters, thermoplastic vulcanized rubbers, fully-neutralized polymers, polycarbonates, polybutylene terephthalates, acrylonitriles, partially-neutralized polymers, and mixtures thereof.

For example, this golf ball can likewise include one or more homopolymeric or copolymeric cover materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN®, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX®, sold by Atofina of Philadelphia, Pa.;

(8) Polyphenylene oxide resins or blends of polyphenylene oxide with high impact polystyrene as sold under the trademark NORYL® by Sabic Company of Pittsfield, Mass.;

(9) Thermoplastic polyesters, such as polyethylene terephthalate, polybutylene terephthalate, polyethylene terephthalate/glycol modified and elastomers sold under the trademark HYTREL® by E.I. DuPont de Nemours & Co. of Wilmington, Del.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

In a further embodiment, the cover of the golf balls may have a thickness of at least about 0.03 inches, preferably 0.03 to 0.125 inches, and more preferably from about 0.05 to 0.1 inches. In another embodiment, one of the inner and outer cover layers may have a thickness of less than about 0.05 inches. The golf balls also may have at least about 60 percent dimple coverage, preferably at least about 80 percent dimple coverage, of the surface area of the cover.

Also, the cover may have a thermoset or polyurethane composition comprising at least one of a UV absorber, a hindered amine light stabilizer, or an optical brightener. In another embodiment, the intermediate and inner cover layer may comprise a moisture resistant composition having a moisture vapor transition rate (MVTR) of 12.5 gmil/100 in2/day or less.

In one embodiment, the preparing of mixtures used in preps for a compression molding and cores may be made using a known core manufacturing procedure in the golf ball art. Any other materials used in forming either the golf ball center or any portion of the core, in accordance with invention, may be combined to form a mixture by any type of mixing known to one of ordinary skill in the art. Suitable types of mixing include single pass and multi-pass mixing, and the like. Suitable mixing equipment is well known to those of ordinary skill in the art, and such equipment may include a Banbury mixer, a two-roll mill, or a twin screw extruder. Conventional mixing speeds for combining polymers are typically used, although the speed must be high enough to impart substantially uniform dispersion of the constituents. Suitable mixing speeds and temperatures are well-known to those of ordinary skill in the art, or may be readily determined without undue experimentation.

The mixture may be subjected to a compression or injection molding process to obtain solid spheres for the center or hemispherical shells for forming an intermediate layer. The polymer mixture may be subjected to a molding cycle in which heat and pressure are applied while the mixture is confined within a mold. The cavity shape depends on the portion of the golf ball being formed. Any other materials used in forming either the golf ball center or any portion of the core, in accordance with the invention, may be combined to form a golf ball by an injection molding process, which is also well-known to one of ordinary skill in the art.

In one embodiment, the golf core composition of the present invention may be produced by mixing a curable dithiane compound along with CB1221® 220, 0.6 pphr dicumyl peroxide, 36 parts per hundred of rubber (pphr) of ZDA, 5 parts per hundred of rubber (pphr) of ZnO, a sufficient amount of density adjusting fillers in an internal mixer followed by 2-roll milling, and thereafter following commonly known core producing manufacturing processes.

In one embodiment, the curable core composition comprises between about 0.25 parts and about 5 pphr of the dithiane compound as represented in the Invention Examples below.

Examples 1.510" Solid Cores Formulation

| MATERIALS | In PPhr (Parts per hundred of rubber) Control without Dithane Compound | In PPhr (Parts per hundred of rubber) Invention Example #1 | In PPhr (Parts per hundred of rubber) Invention Example #2 | In PPhr (Parts per hundred of rubber) Invention Example #3 | In PPhr (Parts per hundred of rubber) Invention Example #4 | In PPhr (Parts per hundred of rubber) Invention Example #5 | In PPhr (Parts per hundred of rubber) Invention Example #6 |
|---|---|---|---|---|---|---|---|
| CB 1221 (Cobalt based BR) | 85 | 85 | 85 | 85 | 85 | 85 | 85 |
| CB 23 (Nd based BR) | 15 | 15 | 15 | 15 | 15 | 15 | 15 |
| Dithiane Compound | 0 | 0.25 | 0.5 | 1 | 2 | 3 | 5 |
| Peroxide | 1 | 1 | 1 | 1 | 1 | 1 | 1 |
| Zinc Pentacholorothiophenol (50% active) in a binder | 0.7 | 0.7 | 0.7 | 0.7 | 0.7 | 0.7 | 0.7 |
| Antioxidant | 0.5 | 0.5 | 0.5 | 0.5 | 0.5 | 0.5 | 0.5 |
| Process Aid | 1 | 1 | 1 | 1 | 1 | 1 | 1 |
| Zinc Diacrylate | 32 | 32 | 32 | 32 | 32 | 32 | 32 |
| Filler - Barytes | 16 | 16 | 16 | 16 | 16 | 16 | 16 |
| Zinc Oxide | 5 | 5 | 5 | 5 | 5 | 5 | 5 |

Based upon information and belief, the said 1.510" solid cores can be made into a 2-piece cover golf ball by either compression or injection molding of a thermoplastic cover materials like Surlyn® ionomers or other suitable thermoplastic polymers and their blends. Similar or slightly modified core formulations may be used to produce cores with varying diameters from 1.53" to 1.60" using the said invention of dithiane compound.

Based upon information and belief, the said 1.510" solid cores may be covered with a casing layer by either compression or injection molding of a thermoplastic cover materials like Surlyn® ionomers or other suitable thermoplastic polymers and their blends and converted into a 3-piece golf ball by casting a thermoset polyurethane or polyurea cover layer around the casing layer or by injection or compression molding a thermoplastic urethane or suitable thermoplastic cover material. It also should be noted that the filler materials listed in the Examples may also include barium sulfate ($BaSO_4$) and other fillers.

The foregoing detailed description describes the invention with reference to specific exemplary embodiments. However, it will be appreciated that various modifications and changes can be made without departing from the scope of the present invention as set forth in the appended claims. The detailed description is to be regarded as merely illustrative, rather than as restrictive, and all such modifications or changes, if any, are intended to fall within the scope of the present invention as described and set forth herein.

Example I

A Golf Ball Comprising a Dithiane Compound

In a first embodiment of the present invention, a golf ball has a cover and a core wherein the core composition may be formed from a curable dithiane based diene rubber compound and additional materials and a cover is formed from a thermoplastic or thermoset materials. The cover has a first Shore D hardness and an outer core surface has a second Shore D hardness wherein the first Shore D hardness is greater than a second Shore D hardness by at least 5, preferably 10.

Example II

A Golf Ball Comprising a Dithiane Compound

In a second embodiment of the present invention, a double cover ball having a core, a cover and an intermediate layer wherein the intermediate layer is formed from a thermoplastic or thermoset having one or more of the following: a flexural modulus of about 50 to 200 kpsi, preferably 60 to 150 kpsi and more preferably 65 to 100 kpsi, a material hardness of 25 to 75 Shore D, preferably 30 to 70 Shore D and more preferably 35 Shore D to 65 Shore D, an elongation at break of about 100 to 400%, preferably 150 to 300% and more preferably 150 to 275%, a tensile strength at break of about 3 to 7 kpsi, preferably 2 to 6 kpsi and more preferably 3 kpsi. The intermediate layer has a thickness of 0.010 to 0.030 inches, preferably 0.015 to 0.025 inches and more preferably 0.1015 to 0.020 inches The core composition may be formed from a curable dithiane rubber compound based on BR and non-BR compositions and additional materials. A core surface hardness is about 20 to 55 Shore D, preferably 25 to 50 Shore D, and most preferably 30 to 45 Shore D. A flexural modulus of the core layer is from 2 to 35 kpsi, preferably 5 to 25 and more preferably 10 to 20 kpsi. The core can be a solid core or a hollow or a fluid filled core. The core may also be a single or double or triple or more layer core.

The outer cover may be formed from a thermoplastic composition including, but not limited to, ionomers, acid copolymers, thermoplastic urethanes as well as from the thermoset polyurethane or polyurea or epoxy and cross-linkable rubber compositions including BR and non-BR formulations. The outer cover has a first Shore D hardness, the intermediate layer has a second Shore D hardness and an outer core surface has a third Shore D hardness wherein the first Shore D hardness is less than a second Shore D hardness by at least 5, preferably 8. The second Shore D hardness is greater than a third Shore D hardness by at least 5, preferably 8.

Example III

A Golf Ball Comprising a Dithiane Compound

In a third embodiment of the present invention, a triple cover ball may have a core composition comprising a dithiane compound and additional materials, a cover, an inner cover layer and an intermediate layer wherein the intermediate layer is formed a thermoplastic or thermoset materials.

The inner cover layer may be formed from a thermoplastic material including ionomers, acid copolymers, highly neutralized polymers, non-ionomers as well as thermoset polyurethane or polyurea and cross-linkable rubbers. The innermost cover layer may have a Shore D hardness of 40 to 67 Shore D, preferably 50 to 65 Shore D, and most preferably 55 to 63 Shore D.

The outer cover layer may be formed from a thermoplastic composition including ionomers and thermoplastic urethanes as well as from thermoset polyurethane or polyurea or epoxy and cross-linkable rubber compositions including BR and non-BR formulations.

Example IV

A Golf Ball Comprising a Dithiane Compound

In a fourth embodiment of the present invention, a triple cover ball may have a core composition comprising a dithiane compound and additional materials, a cover, an inner cover layer and an intermediate layer wherein the inner cover layer is formed a thermoplastic or thermoset materials. The intermediate cover layer may be formed from a thermoplastic material including ionomers, acid copolymers, non-ionomers as well as a thermoset polyurethane or polyurea and cross-linkable rubbers.

The intermediate cover layer has a Shore D hardness of 40 to 67 Shore D, preferably 50 to 65 Shore D, and most preferably 55 to 63 Shore D. The outer cover may be formed from a thermoplastic composition including ionomers and thermoplastic urethanes as well as from a thermoset polyurethane or polyurea or epoxy and cross-linkable rubber compositions including BR and non-BR core formulations. Optionally both intermediate and innermost cover layer has an additional moisture barrier layer material to further protect the cores from the CoR loss.

Of course, the above are merely examples and additional configurations are possible incorporating the dithiane compound. For example, a three piece golf ball may be provided having a core, Surlyn® casing and urethane cover similar to Titleist's Pro V1 golf ball. In another example, a four piece golf ball may be provided having a dual core, Surlyn® casing and urethane cover similar to Titleist's Pro V1x golf ball. In a further example, a three piece golf ball may be provided having a dual core, and Surlyn® cover similar to Titleist's NXT Tour golf ball. In yet another example, the two piece golf ball may be provided having a core and a Surlyn® cover similar to Titleist's T-Solo golf ball.

The golf balls of the present invention can also include one or more other additives as desired in order to produce a golf ball with specific characteristics or properties. Suitable additives include, but are not limited to, chemical blowing and foaming agents, optical brighteners, coloring agents, fluorescent agents, whitening agents, UV absorbers, light stabilizers, defoaming agents, processing aids, mica, talc, nano-fillers, antioxidants, stabilizers, softening agents, fragrance components, plasticizers, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, clay, tungsten, tungsten carbide, silica, lead silicate, regrind (recycled material), and mixtures thereof. Suitable additives are more fully described in, for example, U.S. Pat. No. 7,041,721, the entire disclosure of which is hereby incorporated herein by reference. Other optional additives can include fibers, flakes, particulates, microspheres, pre-expanded beads of glass, ceramic, metal or polymer, and the like which may be optionally foamed.

The core of the present invention may have an Atti compression of less than about 80, more preferably, between about 40 and about 80, and most preferably, between about 50 and about 70. In an alternative, low compression embodiment, the core has a compression less than about 20, more preferably less than about 10, and most preferably, 0. The overall outer diameter ("OD") of the core is less than about 1.610 inches, preferably, no greater than 1.590 inches, more preferably between about 1.540 inches and about 1.580 inches, and most preferably between about 1.50 inches to about 1.570 inches. The OD of the casing of the golf balls of the present invention is preferably between 1.580 inches and about 1.640 inches, more preferably between about 1.590 inches to about 1.630 inches, and most preferably between about 1.600 inches to about 1.630 inches.

The present multilayer golf ball can have an overall diameter of any size. Although the United States Golf Association ("USGA") specifications limit the minimum size of a competition golf ball to 1.680 inches. There is no specification as to the maximum diameter. Golf balls of any size, however, can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

The dithiane compound of the present invention may also be used in golf equipment, in particular, inserts for golf clubs, such as putters, irons, and woods, and in golf shoes and components thereof.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the objective stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A golf ball comprising:
a core; and a cover, the core comprising:
a rubber based compound comprising cis-1,4-polybutadiene rubber;
a crosslinking agent comprising a metallic salt of unsaturated carboxylic acid in an amount between 10 to 50 parts per hundred of rubber;
a peroxide initiator; and
a dithiane compound represented by the following chemical formula

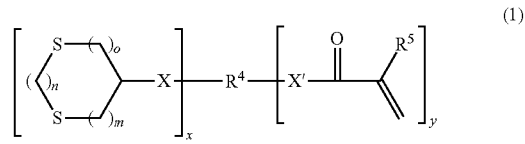

wherein X and X' are each independently an —O— or —$NR^1$—, where $R^1$ is an H or a $C_1$-$C_4$ alkyl group;
each $R^5$ is independently an H, or a $C_1$-$C_4$ alkyl group,
$R^4$ is an organic radical having a valence of x+y,
n is 3 to 6,
m is 1 to 3,
o is 1 to 3,
x and y are at least 1,
one or more methylene groups on the dithiane ring may be substituted with $C_1$-$C_4$ alkyl group, and adjacent alkyl groups may be joined with the carbon atoms to which they are attached to form a carbocyclic ring.

2. The golf ball of claim 1, wherein the core composition comprises between about 0.25 and 5 pphr of the dithiane compound.

3. The golf ball of claim 1, wherein the dithiane compound comprises at least one monomer that comprises a cyclic dithiane moiety linked to a (meth)acryloyl moiety.

4. The golf ball of claim 1, wherein the dithiane compound comprises at least one or more dithiane monomers.

5. The golf ball of claim 1, further comprising: one or more filler materials.

6. The gold ball of claim 1, wherein the core has a range of hardness gradient range from −4 to 8 in JIS C Scale.

7. The golf ball of claim 6, wherein the core has a range of hardness gradient less than 0 to 4 in JIS C Scale.

8. The golf ball of claim 1, further comprising an intermediate layer formed from a thermoplastic or thermoset material.

9. The golf ball of claim 8, further comprising an inner and outer cover layer formed from a thermoplastic or thermoset material.

10. The golf ball of claim 9, wherein at least one of the cover layers comprises a material selected from a group consisting of: ionomeric material, polyolefins, polyurethanes, polyureas, polyamides, acrylic resins, polyphenylene oxide resins, thermoplastic polyesters, thermoplastic vulcanized rubbers, fully-neutralize polymers, polycarbonates, polybutylene terephthalates, partially-neutralized polymers, and mixtures thereof.

11. The golf ball of claim 9, wherein the cover has a thermoset composition comprising at least one of a UV absorber, as hindered amine light stabilizer, or an optical brightener.

12. The golf ball of claim 9, wherein the intermediate and inner cover layer comprise a moisture resistant composition having a moisture vapor transition rate (MVTR) of 12.5 gmil/100 in$^2$/day or less.

13. The golf ball of claim 1, wherein the peroxide initiator is in an amount between 0.25 to 1.5 pphr.

14. The golf ball of claim 1, further comprising: an organo sulfur compound.

15. The golf ball of claim 1, further comprising: an antioxidant.

16. A method of manufacturing a golf ball, comprising: providing the core composition comprising a dithiane compound of claim 1.

* * * * *